W. L. BROWN.
METER.
APPLICATION FILED NOV. 18, 1914.
1,165,568.
Patented Dec. 28, 1915.
2 SHEETS—SHEET 1.
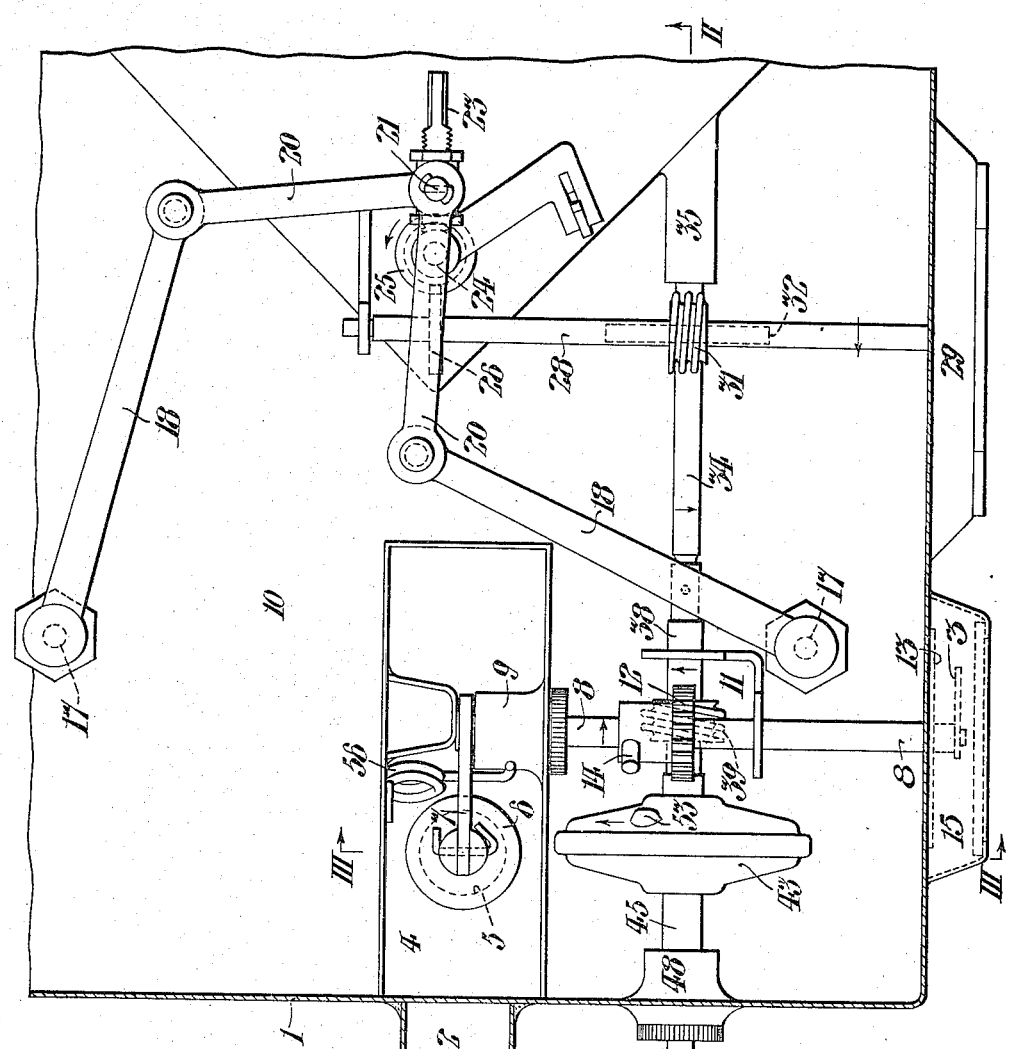
FIG. I.
FIG. IV
WITNESSES:
Philip W. Vessey
Frank E. Paige
INVENTOR:
William Laird Brown,
by Arthur E. Paige,
Attorney.

W. L. BROWN.
METER.
APPLICATION FILED NOV. 18, 1914.
1,165,568.
Patented Dec. 28, 1915.
2 SHEETS—SHEET 2.
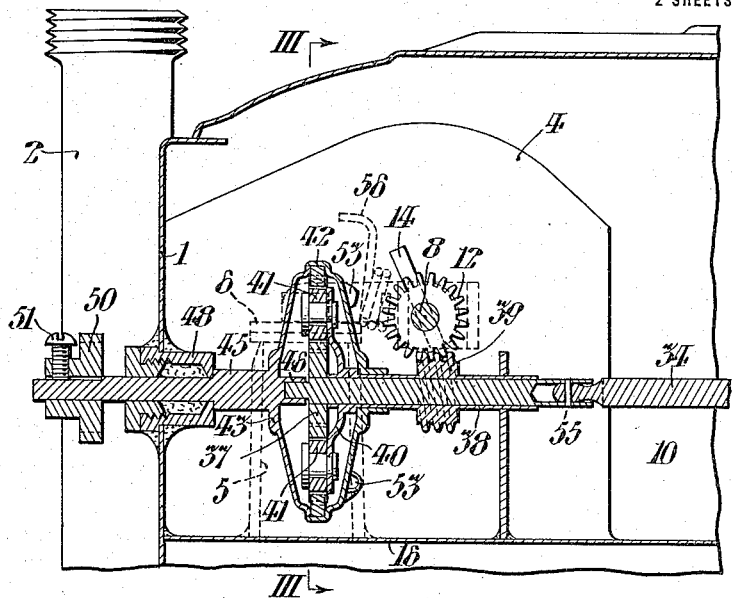
FIG. II.
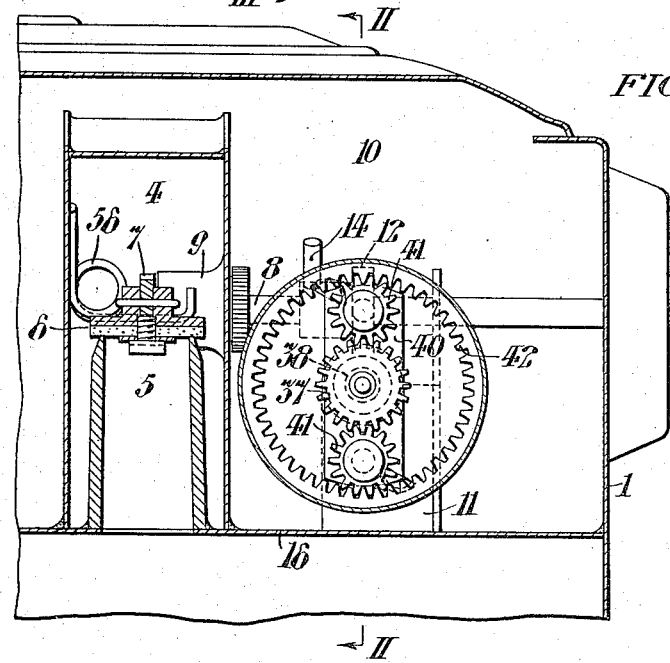
FIG. III.
WITNESSES:
Philip W. Vessey.
Frank E. Paige
INVENTOR:
William Laird Brown,
by Arthur E. Paige,
Attorney.

UNITED STATES PATENT OFFICE.

WILLIAM LAIRD BROWN, OF LANSDOWNE, PENNSYLVANIA, ASSIGNOR TO THE FIRM OF HELME & McILHENNY, OF PHILADELPHIA, PENNSYLVANIA.

METER.

1,165,568.  Specification of Letters Patent.  Patented Dec. 28, 1915.

Application filed November 18, 1914. Serial No. 872,719.

*To all whom it may concern:*

Be it known that I, WILLIAM LAIRD BROWN, a citizen of the United States, residing at Lansdowne, in the county of Delaware and State of Pennsylvania, have invented a certain new and useful Improvement in Meters, whereof the following is a specification, reference being had to the accompanying drawings.

My improvement is particularly applicable to a prepayment gas meter to permit a valve to be manually opened upon insertion of a coin, and automatically closed by the passage of gas through the meter, after delivery of a quantity of gas predetermined by the number of coins inserted.

In the form of my invention chosen for illustration, the valve closing shaft is made in sections connected by a frangible shaft coupling which is claimed in my copending application, Serial 861,361 for Letters Patent of the United States.

My invention includes the various novel features of construction and arrangement hereinafter more definitely specified.

In the drawings:—Figure I is a fragmentary sectional view of a gas meter, known commercially as the "E meter," embodying my invention; only the top plate of said meter being removed. Fig. II is a fragmentary vertical sectional view taken on the line II, II in Figs. I and III. Fig. III is a fragmentary vertical sectional view taken on the line III, III in Figs. I and II. Fig. IV is a fragmentary front elevation of said meter showing the credit dial.

In said figures; the gas meter 1 has the inlet 2 by which the gas enters the valve chamber 4 from which it may pass through the meter 1 by way of the port 5 under control of the valve 6 carried by the lever arm 7 on the rock shaft 8. Said shaft projects through the stuffing box 9 into the chamber 10 from which the gas is excluded, in which it is journaled in the bearing standard 11 and carries the worm gear 12 and radially projecting stop pin 14. Said shaft 8 carries the index 3 arranged to traverse the credit dial 13 in the dial box 15 exterior to the meter casing, to visually manifest the credit status of the meter corresponding with the position of said valve 6, and to warn the operator by the word "Stop" when said valve is opened as far as possible by the insertion of coins.

The meter mechanism beneath the floor 16 of said chamber 10 is of ordinary construction, including diaphragms operatively connected with the rock shafts 17 respectively carrying the lever arms 18 pivotally connected by the links 20 with the adjustable wrist pin 21 on the crank 23. Said crank 23 is carried on the rotary shaft 24 provided with the worm 25 engaging the worm gear 26 on the dial arbor 28, and the latter is operatively connected with suitable mechanism in the dial box 29 to indicate upon the exterior of the meter the quantity of gas which has been vended. Said dial arbor 28 carries the worm 31 engaging the worm gear 32 on the valve closing shaft 34 which is journaled in the bearing bracket 35 and carries at its opposite end a sun gear 37 tight thereon. Said valve closing shaft 34 extends concentrically through the shaft sleeve 38 which has the worm 39 tight thereon in engagement with said worm gear 12 carried by the rock shaft 8, and said sleeve also has tight thereon the planetary gear frame 40 carrying the planetary gears 41 in engagement with said sun gear 37 and in engagement with the internal gear 42 which is tight in the gear casing 43 on the valve opening shaft 45. Said shaft 45 is in axial alinement with said valve closing shaft 34 and has its inner end 46 socketed to form a journal for the outer end of said shaft 34. Said shaft 45 extends through the stuffing box 48 in the outer wall of the meter 1 and carries exterior to said wall the price gear 50 which is secured on said shaft 45 by the set screw 51 and is adapted to coöperative relation with check controlled mechanism of ordinary construction. Said valve opening shaft 45 carries, in rigid relation with said internal gear 42, the stop projection 53 which is conveniently formed in unitary relation with the gear casing 43, by being pressed outwardly from the sheet metal thereof, and is adapted to encounter and coöperate with said stop projection 14 carried by the rock shaft 8 to limit the valve opening movement of the mechanism.

Although the gas valve 6 is intended to stop the flow of gas through the meter when seated upon the port 5; if for any reason said valve permits any gas to pass when thus seated, the continued operation of the meter mechanism, by the gas, produces such torque upon the shaft connections as to break some portion of the mechanism, because said worm 39 is made left handed so that it will then have an axially outward jamming action, to frictionally lock and prevent the coin controlled mechanism from turning; as otherwise it would be then turned, by such abnormal operation of the meter mechanism, as if manually operated upon the insertion of a coin. Such construction and arrangement are obviously important, because it prevents false credit being accorded the user by such leakage of gas past the valve 6. Therefore, I prefer to make said valve closing shaft 34 in sections which normally operate as a single shaft, but which are connected by the frangible coupling 55 so constructed and arranged as to break when subjected to such abnormal torque and before the latter is sufficient to break any other element of the mechanism. However, such a frangible shaft coupling forms the subject matter of my copending application for Letters Patent of the United States above mentioned. I also prefer to avoid lost motion of the mechanism connected with said valve 6, by providing the spring 56 within the valve chamber 4, having one end secured to the wall of said chamber, conveniently by solder, and the other end engaging the valve lever 7 and tending to uphold the valve 6. Said spring 56 is only operative upon the valve lever 7 for about ten degrees at the end of its valve closing movement, to prevent the accidental closure of the valve, by lost motion, before the full value of gas paid for has been delivered through the meter. Said valve 6 being closed, in the position shown in the drawings, is manually opened by means of the coin controlled mechanism turning the shaft 45 in the direction of the arrow marked thereon in Fig. I. In such movement, the internal gear 42 carries the planetary gears 41 and their frame 40 in the same direction; said planetary gears traversing the sun gear 37 as a rack, whether the latter is stationary or turning in the opposite direction, as indicated by the arrow marked on said shaft 34 in Fig. I, which is the direction in which that shaft is rotated by the passage of gas through the meter. Such movement of the planetary gear frame 40, which is carried by the shaft sleeve 38, of course turns the latter and the worm 39 in the direction of the arrow marked on said sleeve in Fig. I; thus turning the worm gear 12, and the rock shaft 8 which carries it, in the direction of the arrows marked thereon; thus raising said valve 6 from its seat. The extent of such movement is of course determined by the number of coins inserted.

The rotation of the valve closing shaft 34 in the direction of the arrow marked thereon in Fig. I of course rotates the sun wheel 37 (which is tight thereon) in the same direction. If said gear casing 43 is stationary during such movement of the valve closing shaft, as it is unless the valve opening shaft is being manually turned by means of the coin controlled mechanism; such movement of the valve closing shaft 34 and sun wheel 37 turns the planetary gears in the opposite direction, causing them to traverse the gear 42, as a rack, and thus turn the shaft sleeve 38 in the direction opposite to that of the arrow marked thereon in Fig. I, and thereby turn the rock shaft 8 in the direction opposite to the arrow marked thereon in Fig. I to shift the valve 6 toward its seat.

It is to be understood that both the valve closing shaft 34 and the valve opening shaft 45 may be simultaneously turned, with the result that the valve is opened by the predominant movement of the valve opening mechanism, but not to as great an extent as if the valve closing shaft 34 remained stationary during the turning movement of the valve opening shaft 45.

When the valve opening movement has been effected to the fullest extent for which the mechanism above described is calibrated, which extent is manifested by the valve lever 7 being pendent in approximately vertical position with respect to the rock shaft 8, the stop projection 53 on the gearing case 43 encounters and coöperates with the stop projection 14 carried by the rock shaft 8 to positively prevent further opening movement of said valve.

I do not desire to limit myself to the precise details of construction and arrangement above set forth, as it is obvious that various modifications may be made therein without departing from the essential features of my invention as defined in the appended claims.

I claim:—

1. In a prepayment gas meter, the combination with a meter casing; of a valve chamber in said meter casing; a valve, in said valve chamber, controlling the passage of gas through the meter; an operating lever, in said valve chamber, pivotally connected to said valve; a rock shaft carrying said lever, extending within and without said valve chamber; a stuffing box in the wall of said valve chamber through which said rock shaft extends; a worm gear on said rock shaft, exterior to said valve chamber; a shaft sleeve extending transversely to said rock shaft; a worm, tight on said shaft sleeve, engaging said gear; a planetary gear frame tight on said sleeve; diametrically opposite planetary gears mounted to rotate on said gear frame; a valve closing shaft extending through said sleeve carrying a sun gear, tight thereon, engaging said planetary gears; a valve opening shaft in axial alinement with said valve closing shaft and having an internal gear tight thereon in engagement with said planetary gears; a sheet metal casing, carried by said valve opening shaft, inclosing said planetary gears; a stop projection formed by an outwardly pressed portion of said gear casing, in unitary relation therewith; and a stop projection carried by said rock shaft, including a pin projecting radially from said shaft; said stop projections being arranged to encounter each other and limit the valve opening movement.

2. In a prepayment gas meter, the combination with a meter casing; of a valve chamber in said meter casing; a valve, in said valve chamber, controlling the passage of gas through the meter; an operating lever, in said valve chamber, pivotally connected to said valve; a rock shaft carrying said lever, extending within and without said valve chamber; a stuffing box in the wall of said valve chamber through which said rock shaft extends; a worm gear on said rock shaft, exterior to said valve chamber; a shaft sleeve extending transversely to said rock shaft; a worm, tight on said shaft sleeve, engaging said gear; a planetary gear frame tight on said sleeve; diametrically opposite planetary gears mounted to rotate on said gear frame; a valve closing shaft extending through said sleeve carrying a sun gear, tight thereon, engaging said planetary gears; a valve opening shaft in axial alinement with said valve closing shaft and having an internal gear tight thereon in engagement with said planetary gears; a casing, carried by said valve opening shaft, inclosing said planetary gears; a stop projection on said gear casing, in unitary relation therewith; and a stop projection carried by said rock shaft; said stop projections being arranged to encounter each other and limit the valve opening movement.

3. In a prepayment gas meter, the combination with a meter casing; of a valve chamber in said meter casing; a valve, in said valve chamber, controlling the passage of gas through the meter; an operating lever, in said valve chamber, pivotally connected to said valve; a rock shaft carrying said lever, extending within and without said valve chamber; a stuffing box in the wall of said valve chamber through which said rock shaft extends; a worm gear on said rock shaft, exterior to said valve chamber; a shaft sleeve extending transversely to said rock shaft; a worm, tight on said shaft sleeve, engaging said gear; a planetary gear frame tight on said sleeve; planetary gears mounted to rotate on said gear frame; a valve closing shaft extending in said sleeve carrying a sun gear, tight thereon, engaging said planetary gears; a valve opening shaft in axial alinement with said valve closing shaft and having an internal gear tight thereon in engagement with said planetary gears; a stop projection carried by said valve opening shaft; and a stop projection carried by said rock shaft; said stop projections being arranged to encounter each other and limit the valve opening movement.

4. In a prepayment gas meter, the combination with a meter casing; of a valve chamber in said meter casing; a valve, in said valve chamber, controlling the passage of gas through the meter; an operating lever, in said valve chamber connected to said valve; a rock shaft carrying said lever, extending within and without said valve chamber; a worm gear on said rock shaft, exterior to said valve chamber; a shaft sleeve extending transversely to said rock shaft; a worm, tight on said shaft sleeve, engaging said gear; a planetary gear frame tight on said sleeve; planetary gears mounted to rotate on said gear frame; a valve closing shaft extending in said sleeve carrying a sun gear, tight thereon, engaging said planetary gears; a valve opening shaft in axial alinement with said valve closing shaft and having an internal gear tight thereon in engagement with said planetary gears; a stop projection carried by said valve opening shaft; and a stop projection carried by said rock shaft; said stop projections being arranged to encounter each other and limit the valve opening movement.

5. In a prepayment gas meter, the combination with a valve controlling the passage of gas through the meter; of an operating lever carrying said valve; a rock shaft carrying said lever; a worm gear on said rock shaft; a shaft sleeve extending transversely to said rock shaft; a worm, tight on said shaft sleeve, engaging said gear; a planetary gear frame tight on said sleeve; a planetary gear mounted to rotate on said gear frame; a valve closing shaft extending in said sleeve, carrying a sun gear, tight thereon, engaging said planetary gear; a valve opening shaft in axial alinement with said valve closing shaft and having an internal gear tight thereon in engagement with said planetary gear; a stop projection carried by said valve opening shaft; and a stop projection carried by said rock shaft; said stop projections being arranged to encounter each other and limit the valve opening movement.

6. In a prepayment gas meter, the combination with a valve controlling the passage of gas through the meter; of an operating lever carrying said valve; a rock shaft carrying said lever; a worm gear on said rock shaft; a shaft sleeve extending transversely to said rock shaft; a worm, tight on said shaft sleeve, engaging said gear; a planetary gear frame tight on said sleeve; a planetary gear mounted to rotate on said gear frame; a valve closing shaft extending in said sleeve, carrying a sun gear, tight thereon, engaging said planetary gear; a valve opening shaft in axial alinement with said valve closing shaft and having an internal gear tight thereon in engagement with said planetary gear; and stop mechanism including a projection carried by said valve opening shaft, arranged to limit the valve opening movement.

7. In a prepayment gas meter, the combination with a valve controlling the passage of gas through the meter; of an operating lever carrying said valve; a rock shaft carrying said lever; a worm gear on said rock shaft; a shaft sleeve extending transversely to said rock shaft; a worm, tight on said shaft sleeve, engaging said gear; a planetary gear frame tight on said sleeve; a planetary gear mounted to rotate on said gear frame; a valve closing shaft extending in said sleeve, carrying a sun gear, tight thereon, engaging said planetary gear; a valve opening shaft in axial alinement with said valve closing shaft and having an internal gear tight thereon in engagement with said planetary gear; and stop mechanism including a projection carried by said rock shaft, arranged to limit the valve opening movement.

8. In a prepayment gas meter, the combination with a meter casing; of a valve chamber in said meter casing; a valve, in said valve chamber, controlling the passage of gas through the meter; an operating lever, in said valve chamber, pivotally connected to said valve; a rock shaft carrying said lever; extending within and without said valve chamber; a stuffing box in the wall of said valve chamber through which said rock shaft extends; a worm gear on said rock shaft, exterior to said valve chamber; a valve closing shaft and a valve opening shaft extending transversely to said rock shaft; planetary gearing operatively connecting said rock shaft with said valve opening shaft and said valve closing shaft, including an internal gear tight on one of said last two shafts; a casing for said planetary gearing carried by said valve opening shaft; a stop projection formed by an outwardly pressed portion of said gear casing, in unitary relation therewith; and a stop projection carried by said rock shaft, including a pin projecting radially from said shaft; said stop projections being arranged to encounter each other and limit the valve opening movement.

9. In a prepayment gas meter, the combination with a meter casing; of a valve chamber in said meter casing; a valve, in said valve chamber, controlling the passage of gas through the meter; an operating lever, in said valve chamber, pivotally connected to said valve; a rock shaft carrying said lever; extending within and without said valve chamber; a stuffing box in the wall of said valve chamber through which said rock shaft extends; a worm gear on said rock shaft, exterior to said valve chamber; a valve closing shaft and a valve opening shaft extending transversely to said rock shaft; planetary gearing operatively connecting said rock shaft with said valve opening shaft and said valve closing shaft, including an internal gear tight on one of said last two shafts; a casing for said planetary gearing carried by said internal gear; a stop projection formed by an outwardly pressed portion of said gear casing, in unitary relation therewith; and a stop projection carried by said rock shaft, including a pin projecting radially from said shaft; said stop projections being arranged to encounter each other and limit the valve opening movement.

10. In a prepayment gas meter, the combination with a meter casing; of a valve chamber in said meter casing; a valve, in said valve chamber, controlling the passage of gas through the meter; an operating lever, in said valve chamber, pivotally connected to said valve; a rock shaft carrying said lever; extending within and without said valve chamber; a stuffing box in the wall of said valve chamber through which said rock shaft extends; a worm gear on said rock shaft, exterior to said valve chamber; a valve closing shaft and a valve opening shaft extending transversely to said rock shaft; planetary gearing operatively connecting said rock shaft with said valve opening shaft and said valve closing shaft, including an internal gear tight on one of said last two shafts; a casing for said planetary gearing carried by one of said last two shafts; a stop projection on said gear casing, in unitary relation therewith; and a stop projection carried by said rock shaft; said stop projections being arranged to encounter each other and limit the valve opening movement.

11. In a prepayment gas meter, the combination with a meter casing; of a valve chamber in said meter casing; a valve, in said valve chamber, controlling the passage of gas through the meter; an operating lever, in said valve chamber, pivotally connected to said valve; a rock shaft carrying said lever; extending within and without said valve chamber; a stuffing box in the wall of said valve chamber through which said rock shaft extends; a worm gear on said rock shaft, exterior to said valve chamber; a valve closing shaft and a valve opening shaft extending transversely to said rock shaft; planetary gearing operatively connecting said rock shaft with said valve opening shaft and said valve closing shaft, including an internal gear tight on one of said last two shafts; a stop projection carried by said valve opening shaft; and a stop projection carried by said rock shaft; said stop projections being arranged to encounter each other and limit the valve opening movement.

12. In a gas meter, the combination with a valve controlling the passage of gas through the meter; of an operating lever pivotally connected to said valve: a rock shaft carrying said lever; a worm gear on said rock shaft; a valve closing shaft and a valve opening shaft extending transversely to said rock shaft; planetary gearing operatively connecting said rock shaft with said valve opening shaft and said valve closing shaft, including an internal gear tight on said valve opening shaft; a stop projection carried by said valve opening shaft; and a stop projection carried by said rock shaft; said stop projections being arranged to encounter each other and limit the valve opening movement.

13. In a gas meter, the combination with a valve controlling the passage of gas through the meter; of an operating lever connected to said valve; a rock shaft carrying said lever; a worm gear on said rock shaft; a valve closing shaft and a valve opening shaft extending transversely to said rock shaft; planetary gearing operatively connecting said rock shaft with said valve opening shaft and said valve closing shaft, including an internal gear tight on one of said last two shafts; a stop projection carried by said valve opening shaft; and a stop projection carried by said rock shaft; said stop projections being arranged to encounter each other and limit the valve opening movement.

14. In a prepayment gas meter, the combination with a meter casing; of a valve chamber in said meter casing; a valve, in said valve chamber, controlling the passage of gas through the meter; an operating lever, in said valve chamber, pivotally connected to said valve; a rock shaft carrying said lever, extending within and without said valve chamber; a stuffing box in the wall of said valve chamber through which said rock shaft extends; a valve closing shaft and a valve opening shaft; means operatively connecting said rock shaft with said valve opening shaft and said valve closing shaft; a stop projection carried by said valve opening shaft; and a stop projection carried by said rock shaft; said stop projections being arranged to encounter each other and limit the valve opening movement.

15. In a gas meter, the combination with a meter casing; of a valve chamber in said meter casing; a valve, in said valve chamber, controlling the passage of gas through the meter; an operating lever, in said valve chamber, connected to said valve; a rock shaft carrying said lever, extending within and without said valve chamber; a stuffing box in the wall of said valve chamber through which said rock shaft extends; a valve closing shaft and a valve opening shaft; means operatively connecting said rock shaft with said valve opening shaft and said valve closing shaft; a stop projection carried by said valve opening shaft; and a stop projection carried by said rock shaft; said stop projections being arranged to encounter each other and limit the valve opening movement.

16. In a gas meter, the combination with a valve controlling the passage of gas through the meter; of an operating lever carrying said valve; a rock shaft carrying said lever; a valve closing shaft and a valve opening shaft; means operatively connecting said rock shaft with said valve opening shaft and said valve closing shaft; a stop projection carried by said valve opening shaft; and a stop projection carried by said rock shaft; said stop projections being arranged to encounter each other and limit the valve opening movement.

17. In a gas meter, the combination with a valve controlling the passage of gas through the meter; of a valve opening shaft; a valve closing shaft; rotary check controlled mechanism operatively connected with said valve opening shaft; rotary meter mechanism operatively connected with said valve closing shaft; gearing operatively connecting said valve with said shafts, including a worm of such pitch as to axially thrust said check controlled mechanism and frictionally prevent the rotation thereof, when said worm is turned by movement of said meter mechanism after said valve is shut; and a frangible element in the train connecting said meter mechanism with said valve, constructed and arranged to break when said check controlled mechanism is thus prevented from turning; whereby abnormal movement of said check controlled mechanism by said meter mechanism is prevented.

18. In a gas meter, the combination with a valve controlling the passage of gas through the meter; of a valve opening shaft; a valve closing shaft; check controlled mechanism operatively connected with said valve opening shaft; meter mechanism operatively connected with said valve closing shaft; gearing operatively connecting said valve with said shafts, including a worm of such pitch as to axially thrust said check controlled mechanism and thereby prevent movement thereof, consequent upon movement of said meter mechanism after said valve is shut; and a frangible element in the train connecting said meter mechanism with said valve, constructed and arranged to break when said check controlled mechanism is thus prevented from turning; whereby abnormal movement of said check controlled mechanism by said meter mechanism is prevented.

19. In a gas meter, the combination with a valve controlling the passage of gas through the meter; of a valve opening shaft; a valve closing shaft; check controlled mechanism operatively connected with said valve opening shaft; meter mechanism including a left hand rotary dial arbor operatively connected with said valve closing shaft; gearing operatively connecting said valve with said shafts, including a worm arranged for left hand rotation by said dial arbor and of such pitch as to axially thrust said check controlled mechanism outward and thereby prevent movement thereof, consequent upon movement of said meter mechanism after said valve is shut; and a frangible element in the train connecting said meter mechanism with said valve, constructed and arranged to break when said check controlled mechanism is thus prevented from turning; whereby abnormal movement of said check controlled mechanism by said meter mechanism is prevented.

In testimony whereof, I have hereunto signed my name at Philadelphia, Pennsylvania, this seventh day of November, 1914.

WILLIAM LAIRD BROWN.

Witnesses:
E. H. FACKLER,
JOHN H. BRICKER.

Copies of this patent may be obtained for five cents each, by addressing the "Commissioner of Patents, Washington, D. C."